United States Patent [19]
Cohu

[11] Patent Number: 5,482,178
[45] Date of Patent: Jan. 9, 1996

[54] RECEPTACLE WITH A DEFORMABLE FOOT SUSCEPTIBLE OF SERVING AS A SAUCER

[75] Inventor: Philippe Cohu, Bretoncelles, France

[73] Assignee: Soparco, France

[21] Appl. No.: 248,912

[22] Filed: May 25, 1994

[30] Foreign Application Priority Data

Feb. 16, 1994 [FR] France .................. 94 01848

[51] Int. Cl.⁶ ................ B29C 45/00; A01G 9/02
[52] U.S. Cl. ........................... 220/469; 47/71
[58] Field of Search ................... 220/469; 47/71

[56] References Cited

U.S. PATENT DOCUMENTS 4,891,905  1/1990  Stolz ............................. 47/66

FOREIGN PATENT DOCUMENTS 0351030  1/1990  European Pat. Off. .
0381023  1/1990  European Pat. Off. .
9115539  6/1993  France .
2684918  6/1993  France .
0059656  10/1969  Luxembourg .
0858887  1/1961  United Kingdom .

*Primary Examiner*—Steven M. Pollard
*Attorney, Agent, or Firm*—William A. Drucker

[57] ABSTRACT

The receptacle embodying the invention comprises an elastically deformable tubular element prolonged by a tubular portion so as to enable it to be turned upwards in order to constitute an annular pan beneath the receptacle that can be assimilated with a saucer. This foot is further equipped with a hinging means designed to enable the foot to be deformed, by having at least two stable annular pan-shaped conformations, according to a bistable conformation process with reversal of concavity, after passing two fulcrums. This receptacle can be used as a horticultural pot.

7 Claims, 1 Drawing Sheet

RECEPTACLE WITH A DEFORMABLE FOOT SUSCEPTIBLE OF SERVING AS A SAUCER

BACKGROUND OF THE INVENTION

1. Field of the Invention

This invention relates to a receptacle such as a horticultural pot comprising a deformable foot susceptible of taking on, from an initial downwardly flared shape, at least one conformation serving as a saucer.

2. Description of the Prior Art

In a general manner, it is known that propositions have already been made, notably in French patent application No. 91-15539 in the name of the filing party hereof, for a receptacle of this type of which the foot comprises a tubular element prolonged by a swanneck portion that can be elastically deformed in a bistable manner, in order to be capable of being turned upwards, so as to constitute an annular pan that can be assimilated with a saucer, beneath the receptacle. Advantageously, the upper rim of the saucer-shaped portion is situated at a height in excess of that of the base of the receptacle, the latter then being fitted with bores enabling drainage water to run off into the saucer.

By way of these features, once the saucer is full, it can be used for watering due to the fact that the water can rise, by capillarity, into the soil contained in the receptacle.

Experience has proved that this process does not always suit horticulturists using automatic watering systems and who wish to obtain as good a drainage as possible. It is for this reason that horticulturists want to be supplied with swanneck-shaped feet (foot function).

This method of supply has the drawback of being costly due to the fact that, when the feet are in the out-spread position, the receptacles are more cumbersome and take up a greater volume during storage and transportation. This therefore substantially increases the cost of these operations.

Moreover, when used with its foot in the outspread position, the receptacle cannot be set down in a cultivation area and must therefore be hung up. Due to the weight of the plant and soil and to the heat, the foot can slowly subside over time and reach the fulcrum beyond which it automatically turns up to take on the shape of a saucer. Furthermore, molecular migration in materials entails a loss of elasticity and definitive deformation which makes the foot lose its ability to reverse concavity after passing the fulcrum.

OBJECT OF THE INVENTION

The main object of this invention is therefore more particularly to remedy the preceding disadvantages.

SUMMARY OF THE INVENTION

Accordingly, the invention proposes, to this end, a receptacle of structure similar to the structure previously described, but in which the foot is designed so as to be able to elastically deform itself to have at least two stable conformations in the form of an annular pan susceptible of serving as saucers, according to a bistable conformation process with reversal of concavity after passing at least two successive fulcrums.

Advantageously, the foot can initially be in the shape of a downwardly-flared swanneck comprising, in its median part, a coaxial circular folding line constituting an elastic hinge which separates said foot into two crowns (outer and inner) so as to enable the obtaining of two successive upturning phases with reversal of concavity after passing two respective fulcrums:

- a first upturning phase during which the outer crown of the foot undergoes a reversal of concavity in order to form a first saucer of which the upper rim is situated at the required level, e.g. below the level of the draining holes, in order to achieve better drainage, and
- a second upturning phase during which the inner crown of the foot undergoes a reversal of concavity to form, with the outer crown, a second saucer of which the upper rim in situated above the level of the draining holes.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENTS

Figure 1:
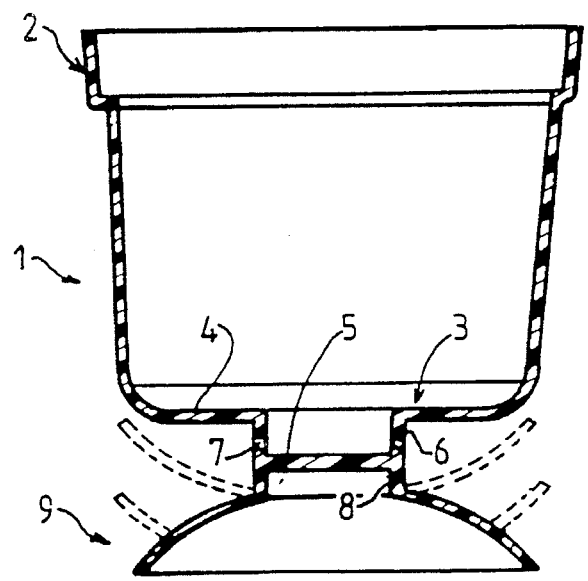
FIG. 1 is a schematic axial sectional drawing of a horticultural pot embodying the invention.
Figure 2:
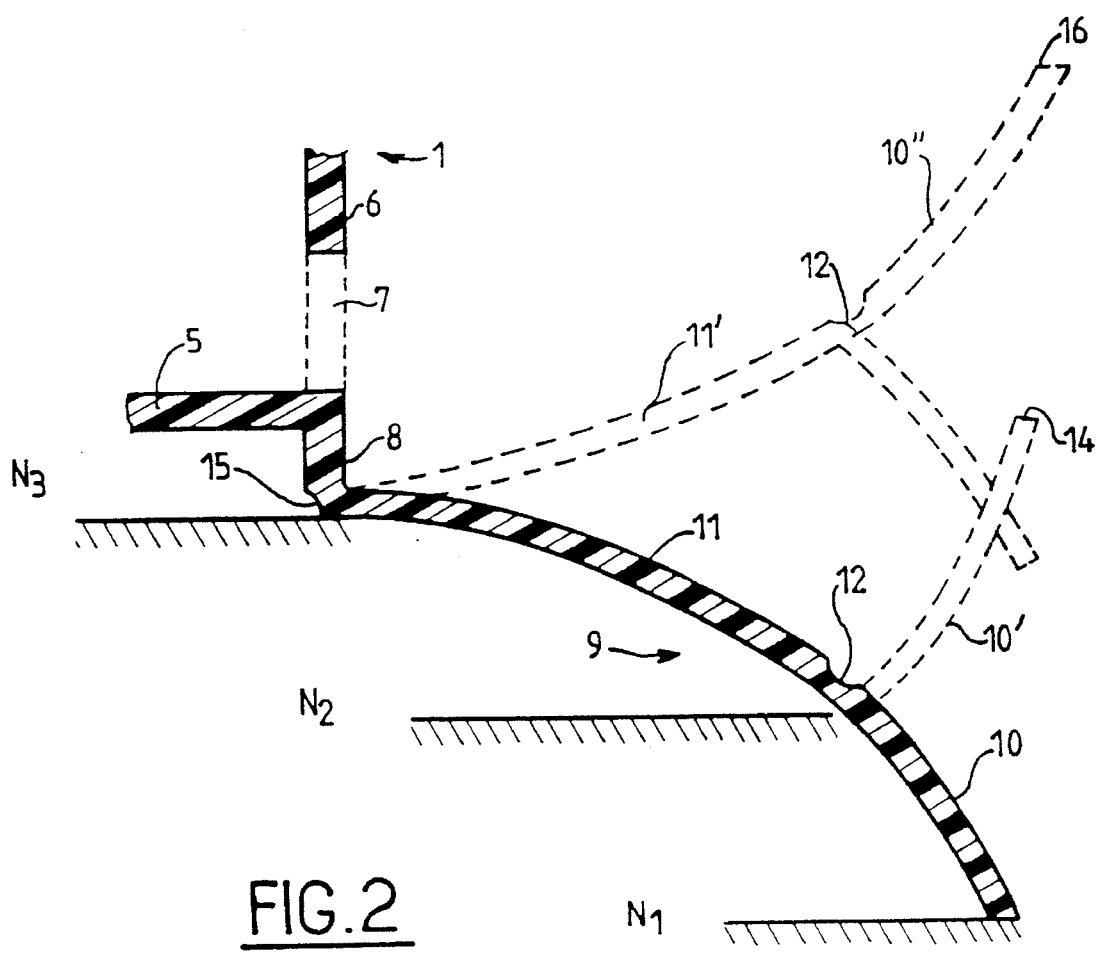
FIG. 2 is a schematic view on a larger scale of the pot foot represented in FIG. 1, in an axial half-sectional drawing.

In the example represented in these drawings, the horticultural pot comprises a substantially conical tubular body 1 of which the upper part has a rim 2 and of which the lower part is ended by a base 3 comprising two stepped portions axially offset in relation to one another 4, 5, and connected together by a coaxial cylindrical section 6. One 4 of these two parts is crown-shaped, while the other 5 is disk-shaped and is axially offset downwards in relation to the first one.

The cylindrical section 6 is fitted with a series of radial bores 7 serving notably to drain sprinkling water from the pot. It is prolonged, on the other side of the disk, by a low cylindrical portion 8 to which is connected a coaxial tubular foot 9 (of swanneck-shaped cross-section) flared outwardly.

According to the invention, this foot 9 is divided into two parts (outer 10/inner 11) by a circular folding line 12 forming an elastic hinge. In this example, the folding line is classically constituted by a portion of lesser thickness.

As previously described, the pot can be manufactured by molding of a plastic material, e.g. in the manner disclosed in the above-mentioned patent application, with the foot 9 in the out-spread position (position represented in full lines).

Despite the previously mentioned drawbacks, the pot can of course be place on the ground in this position (level $N_1$).

From this position, the outer part 10 of the foot 9 can be upturned at the works plant, by means of the bistable deformation process using upturning about the hinge 12, with reversal of concavity, after passing a first fulcrum.

This upturning stage is performed outside of the mold by means of a relatively simple and purely mechanical piece of equipment whose rate is never slower than that of the mold (so as not to slow down the rate of the latter).

This piece of equipment can comprise a means enabling the body to be held and a means enabling a relative displacement of the base of the foot to be generated in the direction of the body.

At the end of this stage, the foot forms a first annular pan of which the bottom constitutes the base of the foot and can be placed on the ground (level $N_2$). The geometrical shape of the foot thus obtained (which comprises the inner portion 11 in full lines and the outer portion 10' in broken lines) thus confers greater rigidity than in the previous case. Cultivation in standing pots can then be considered. Furthermore, the dimensions of the foot 9 are designed so that the upper rim 14 of this first pan will be at a level below that of the draining holes 7. This avoids rotting of the roots due to the permanent presence of water during cultivation at the horticulturists premises.

In this position, the pots can be nested into one another with a view to storage and transportation thereof to the horticulturists' premises. The latter can then either stand them on the ground or hang them up. They then ensure perfect drainage. The water contained in the annular pan 10', 11 (coming from excess sprinkling water) plays a part in increasing the stability thereof.

The pot can then be transformed into a water-reserve pot by again upturning the foot 9, though this time about its junction line 15 with the cylindrical portion 8 (which constitutes a second folding line).

This upturning is performed in a similar manner to the previous upturning, by means of the same process of reversal of concavity (of the inner part of the foot) with a passing of the fulcrum. An annular pan is thus obtained in the shape of a saucer 10"–11' of which the upper rim 16 extends at a level situated above the draining holes 7. The pot can be placed on the ground in this position (level $N_3$). A water-reserve pot is thus obtained, with the water being susceptible of rising into the soil by capillarity, either directly or via a fiber wick.

A fourth position can also be obtained from this last position by folding the outer part 10" of the foot 9 back over the folding line 12. Such a solution can be envisaged, if necessary, to increase the stability of the pot.

I claim:

1. A receptacle made of molded plastic material and provided with a tubular foot which comprises first and second successive tubular portions, said first portion being connected to said receptacle and said second portion having a shape flared outwardly and being provided with a circular hinging means which divides said second portion into an inner tubular part and an outer tubular part and which allows said outer part to be upturned at ambiant temperature about said hinging means by elastically deforming said inner tubular part to form with said inner tubular part an annular saucer extending beneath said receptacle, said saucer having a bottom which constitutes a base for said foot.

2. A receptacle provided with a tubular foot which comprises first and second successive portions, said first portion being connected to the receptable and said second portion having a shape flared outwardly and being connected to the first portion through a first circular hinging means which allows said second portion to be upturned about said first hinging means and to form with said first portion a first annular saucer extending beneath said receptacle, said second portion being divided by a second circular hinging means into an inner part and an outer part which may be upturned about said second annular hinging means so as to form with said inner part a second annular saucer extending beneath said receptacle.

3. The receptacle as claimed in claim 2 wherein said second hinging means comprises at least one line of lesser thickness.

4. The receptacle as claimed in claim 2, wherein said receptacle has a base which is fitted with draining holes, and wherein said first saucer has an upper rim which is situated above said holes, while said second saucer has an upper rim which is situated below said holes.

5. The receptacle as claimed in claim 2, wherein said receptacle comprises a base provided with two stepped parts axially offset in relation to one another by a coaxial cylindrical section fitted with radial draining holes.

6. The receptacle as claimed in claim 5, wherein said cylindrical section is prolonged, beyond said base, by said first portion of the foot.

7. The receptacle as claimed in claim 2, wherein said first portion of the foot has a cylindrical shape.

* * * * *